(No Model.) 2 Sheets—Sheet 1.

A. AUCHLY.
HOG TRAP.

No. 584,536. Patented June 15, 1897.

Witnesses:
Inventor
A. Auchly.
By James J. Shelby
Attorney

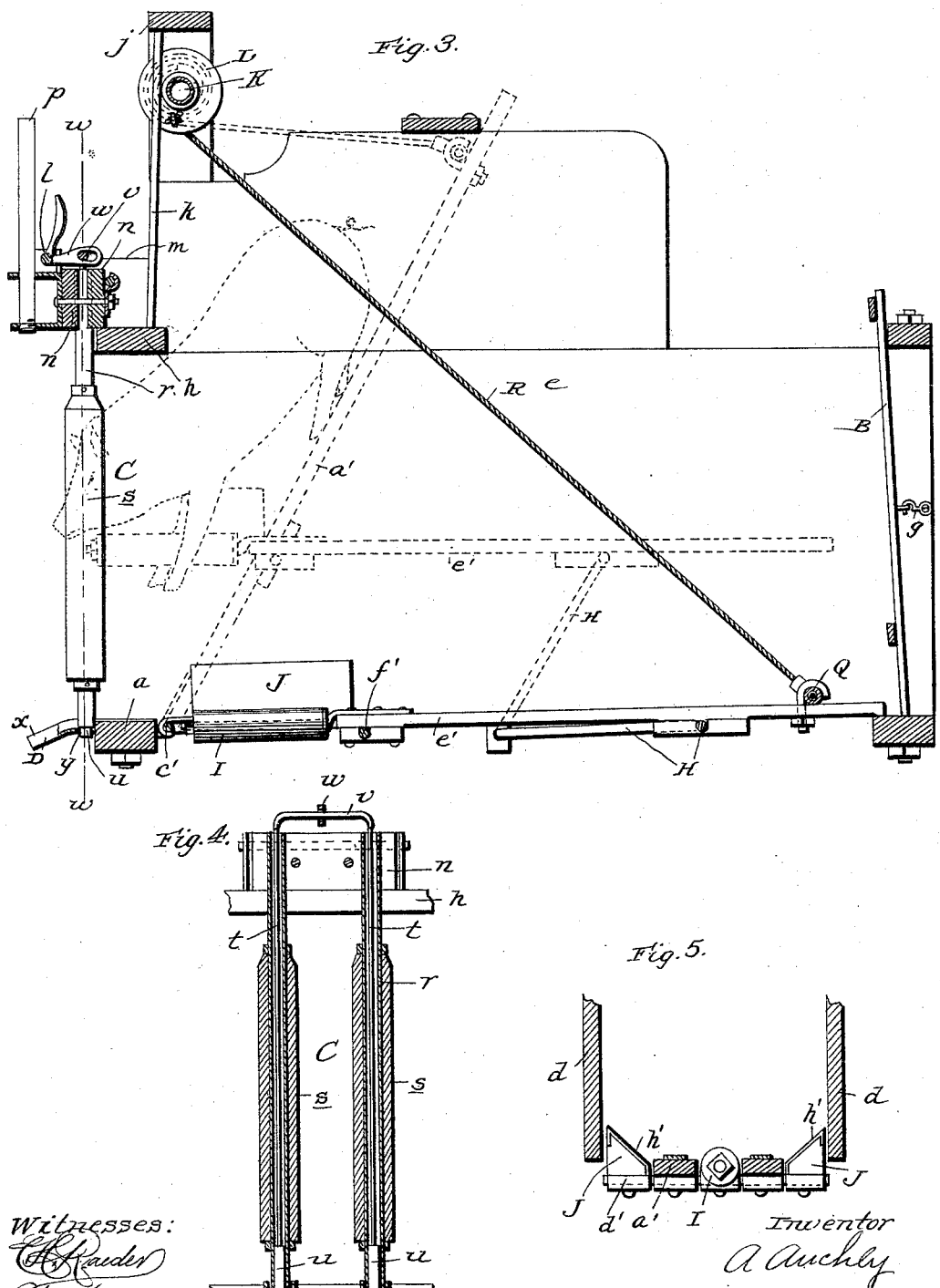

UNITED STATES PATENT OFFICE.

ALBERT AUCHLY, OF MONTGOMERY CITY, MISSOURI.

HOG-TRAP.

SPECIFICATION forming part of Letters Patent No. 584,536, dated June 15, 1897.

Application filed April 1, 1897. Serial No. 630,243. (No model.)

*To all whom it may concern:*

Be it known that I, ALBERT AUCHLY, a citizen of the United States, residing at Montgomery City, in the county of Montgomery and State of Missouri, have invented certain new and useful Improvements in Hog-Ringing Traps; and I do declare the following to be a full, clear, and exact description of the invention, such as will enable others skilled in the art to which it appertains to make and use the same.

My invention relates to a hog-ringing trap or apparatus for facilitating the ringing of hogs; and its novelty and many advantages will be fully understood from the following description and claims when taken in conjunction with the annexed drawings, in which—

Figure 1:
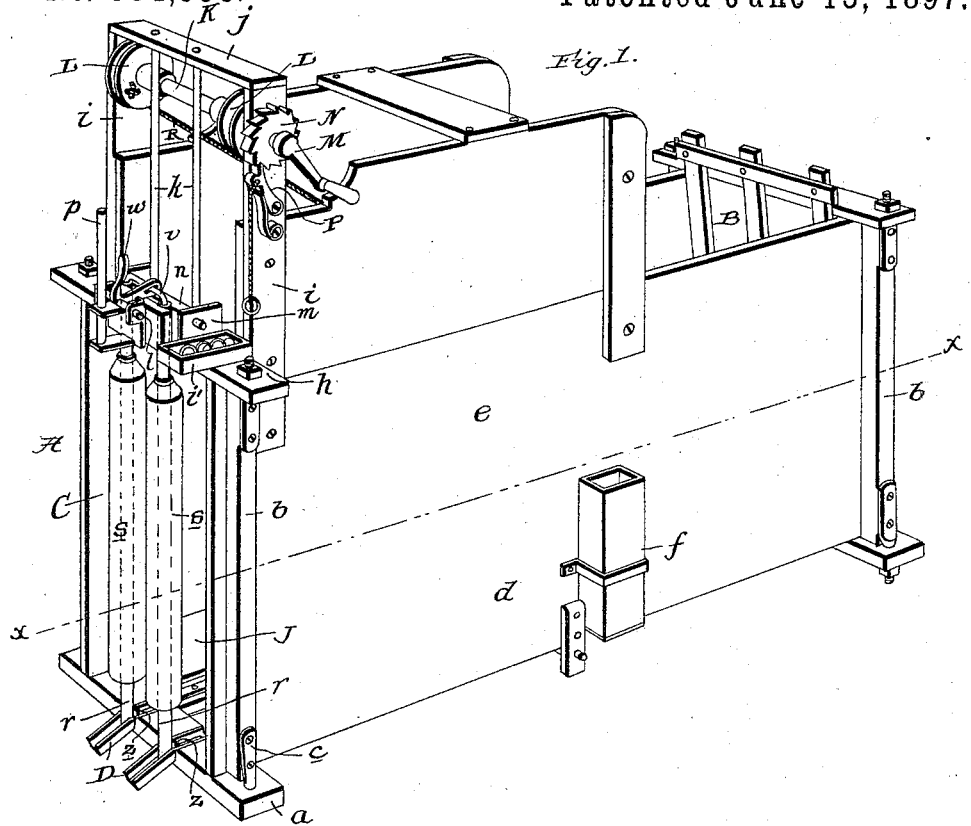
Figure 2:
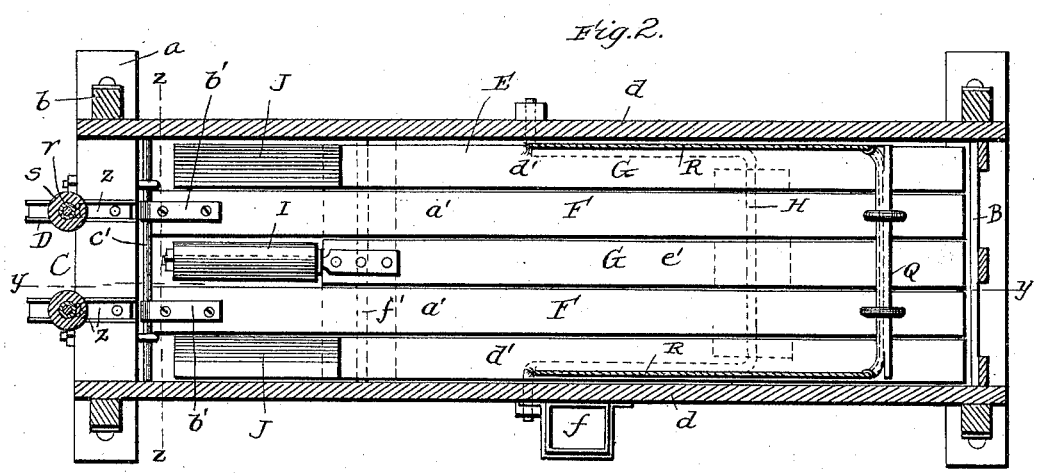

Figure 1 is a perspective view of my improved trap. Fig. 2 is a horizontal section taken in the plane indicated by the line $x\ x$ of Fig. 1. Fig. 3 is a vertical longitudinal central section taken in the plane indicated by the line $y\ y$ of Fig. 2. Fig. 4 is a detail section taken in the plane indicated by the line $w\ w$ of Fig. 3, and Fig. 5 is a detail transverse section taken in the plane indicated by the line $z\ z$ of Fig. 2.

In the said drawings similar letters designate corresponding parts in all of the views, referring to which—

A indicates the crate of my improved trap, which preferably comprises sills $a$, studding $b$, strap-bolts $c$, and boards $d$, which serve, in conjunction with the studding, to form the side walls $e$, as shown. These side walls $e$ are reduced in height at the rear portion of the crate, as illustrated, so as to enable an attendant, after dipping a brush in a can $f$, containing coal-oil, to conveniently reach over the side of the crate and apply the oil to the hog therein, so as to prevent the propagation of vermin on such hog. At its rear end the crate A is provided with a gate B, which is removably secured by hooks $g$ or other suitable means, so as to permit of its being readily removed when a hog is to be driven into the crate and as readily replaced and secured to hold the hog in the crate, and at its forward end said crate is provided with the cross-bar $h$, standards $i$, cross-bar $j$, and the bars $k$, connecting the cross-bars $h\ j$, the purpose of said bars $k$ being to prevent the hogs from jumping out the front end of the crate.

C indicates the forward gate of the crate. This gate C comprises a rock-shaft $l$, journaled in short standards $m$, rising from bar $h$, the head $n$, fixedly connected to shaft $l$ and provided with the handle $p$, and the rods $r$, which are fixedly connected to and depend from the head $n$, as shown. These rods $r$ are designed to receive the heads of hogs between them in the manner illustrated in Fig. 3, and for the purpose of preventing injury to the hogs they are, in preference, provided with loose rollers $s$, as shown. Said rods $r$ are also tubular for the passage of rods $t$, which carry gravitating bolts $u$ at their lower ends and have their upper ends connected by a cross-bar $v$, said cross-bar being in turn loosely connected to a lever $w$, fulcrumed on head $n$, as illustrated.

From the foregoing it will be seen that the operator is enabled, by grasping the handle $p$, to swing the gate C forwardly and upwardly, so as to permit the hog to escape from the crate after he has been ringed, as presently described.

The gate C is designed to be secured in its closed position by keepers D, which are preferably formed of channel-iron and have the forward downwardly-pitched portions $x$, the apertures $y$, and the stops $z$ in rear of said apertures. In virtue of this it will be seen that when the gate C is lowered to its closed and operative position the gravitating bolts $u$ will seat in the apertures $y$ of the keepers D and will securely fasten the gate, rendering it necessary to raise the bolts through the medium of lever $w$ before the gate can be swung up into its open position.

E indicates the vertically-movable bottom of the crate. This bottom E comprises the hinged section F, formed by parallel slats $a'$, having loops $b'$ at their forward ends, loosely receiving a transverse rod $c'$, fixed in the lower corner of the crate A, and the bodily-movable section G, formed by slats $d'$, arranged outside the slats $a'$ of section F, and the slat $e'$, arranged between the slats $a'$ of section F. The sections F G are pivotally connected at an intermediate point of their length by a transverse pintle $f'$, (see Fig. 2,) so as to enable their several slats to rest flush with each other or in the same horizontal plane when the bottom is in its lowermost position, as shown by full lines in Fig. 2 and also in Fig.

5, and the bodily-movable section G is also pivotally connected to the transverse portion of a bail H, which is pivotally connected to the base of the crate, as shown, whereby it will be seen that when the forward portion of section G is raised with section F the rear portion of said section G will be correspondingly raised.

As better shown in Figs. 2 and 5, the middle slat $e'$ of the section G is provided at its forward ends with an antifriction-roller I, while the outer slats $d'$ are provided at their forward ends with the portions J, which have their upper sides beveled downwardly and upwardly and also have such upper sides covered with galvanized sheet metal $h'$, so as to render them more slippery. The said portions J of slats $d'$ are designed and adapted to prevent the hog from finding a foothold when the sections F G assume the position shown by dotted lines in Fig. 3, and thus insure the hog straddling the roller I and compel him to hold his muzzle between the rollers $s$ in a convenient position to enable the operator to place a ring in his nose.

K indicates a shaft which is journaled in the standards $i$, rising from the crate A. This shaft K is provided with pulleys L, a crank M, and a ratchet-wheel N, the latter being engaged and held against retrograde movement by a spring-pressed dog or pawl P, as illustrated.

Q indicates a transverse tube which is connected to the section F, adjacent to the rear end thereof, and R indicates a cable which is connected to and designed to be wound upon the pulleys L and is passed loosely through the tube Q, the said tube being designed to permit the cable R to adjust itself so as to prevent one side of the section F from sagging below the other and also insure the easy working of the parts.

In the practical operation of the trap the gate B is removed and the hog to be ringed is driven into the crate, where he will stand upon the bottom E, which will then be in the position shown by full lines in Figs. 2 and 3. The gate B is then replaced and secured to the crate, after which the shaft K is turned so as to raise the bottom sections to the position shown by dotted lines in Fig. 3. This will force the hog into the position shown by dotted lines in Fig. 3, and he will be held in such position with his muzzle between the rollers $s$, as illustrated. With the hog held in such position the operator can take a ring from receptacle $i$ and conveniently fix it in the hog's nose with the aid of the ordinary well-known implements. After the hog is ringed the gate C is unlatched and raised and the hog is permitted to slide out the forward end of the crate. The pawl or dog P is then disengaged from the ratchet-wheel N, and the bottom E is permitted to fall to its lower position.

With the aid of a trap or apparatus embodying my invention it will be seen that a single person is enabled to easily and quickly ring hogs of large size, and this with but a minimum amount of effort.

It will also be seen that my improved crate, notwithstanding its many advantages, is exceedingly cheap and simple and is also durable, since it embodies no complicated parts.

When desired, the crate may be provided with wheels to permit of its being conveniently moved from place to place.

Having thus described my invention, what I claim is—

1. In a hog-ringing trap or apparatus, the combination of a crate having vertical rods at its forward end, the bottom section F, having slats $a'$, pivotally connected at their forward ends to the forward, lower portion of the crate, the bottom section G, having slats $d'$, with beveled portions at their forward ends and a slat $e'$, with a roller at its forward end; said slats $d'$, $e'$, being arranged alongside of and pivotally connected at an intermediate point of their length with the slats $a'$, of section F, a bail pivotally connected with the lower portion of the crate and having its transverse portion journaled in bearings on the bottom section G, and suitable means for raising the rear end of section F, substantially as specified.

2. In a hog-ringing trap or apparatus, the combination of a crate having vertical rods at its forward end, the bottom comprising a section connected in a hinged manner to the forward, lower end of the crate, and the bodily-movable section pivotally connected to the hinged section at an intermediate point in its length, the bail connected to the bodily-movable section and the crate, a transverse tube connected to the hinged section of the bottom, a winding-shaft journaled on the crate, and a cable extending loosely through said transverse tube and connected at its ends with the winding-shaft, substantially as specified.

3. In a hog-ringing trap or apparatus, the combination of a crate having vertical rods at its forward end, the bottom section F, having slats $a'$, pivotally connected at their forward ends to the forward, lower portion of the crate, the bottom section G, having slats $d'$, with beveled portions at their forward ends and a slat $e'$, with a roller at its forward end; said slats $d'$, $e'$, being arranged alongside of and pivotally connected at an intermediate point of their length with the slats $a'$, of section F, a bail pivotally connected with the lower portion of the crate and having its transverse portion journaled in bearings on the bottom section G, a transverse tube connected to the section F, of the bottom, a winding-shaft journaled on the crate, and a cable passed loosely through said tube and connected at its ends with the winding-shaft, substantially as specified.

4. In a hog-ringing trap or apparatus, the combination of the crate having keepers at the lower portion of its forward end, the vertically-movable gate having its upper end connected in a hinged manner with the crate and comprising vertical tubular rods, gravitating bolts arranged in said tubular rods and adapted to engage the keepers, a handle-lever, and a connection between said handle-lever and the bolts; said connection extending through the tubular rods, substantially as specified.

5. In a hog-ringing trap or apparatus, the combination of the crate having keepers at the lower portion of its forward end, the vertically-movable gate having its upper end connected in a hinged manner with the crate and comprising vertical tubular rods, rollers loosely mounted on said rods, gravitating bolts arranged in the tubular rods and adapted to engage the keepers, a handle-lever and a connection between the lever and bolts extending through the tubular rods, substantially as specified.

In testimony whereof I affix my signature in presence of two witnesses.

ALBERT AUCHLY.

Witnesses:
  W. L. GUPTON,
  W. M. GILCHRIST.